(12) United States Patent
Scrivano et al.

(10) Patent No.: US 12,405,923 B2
(45) Date of Patent: Sep. 2, 2025

(54) VALIDATION OF CONTAINER IMAGES

(71) Applicant: Red Hat, Inc., Raleigh, NC (US)

(72) Inventors: Giuseppe Scrivano, Milan (IT);
Alexander Larsson, Stockholm (SE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/488,179

(22) Filed: Oct. 17, 2023

(65) Prior Publication Data

US 2025/0124002 A1    Apr. 17, 2025

(51) Int. Cl.
*G06F 16/16*    (2019.01)
*G06F 9/54*    (2006.01)
*G06F 11/07*    (2006.01)
*G06F 11/30*    (2006.01)

(52) U.S. Cl.
CPC ............ *G06F 16/164* (2019.01); *G06F 9/545* (2013.01); *G06F 11/0769* (2013.01); *G06F 11/3086* (2013.01)

(58) Field of Classification Search
CPC .... G06F 16/164; G06F 9/545; G06F 11/0769; G06F 11/3086
See application file for complete search history.

(56) References Cited

U.S. PATENT DOCUMENTS

| | | | |
|---|---|---|---|
| 9,811,806 B1 | 11/2017 | Kuang et al. | |
| 2003/0056054 A1* | 3/2003 | Levy | ........................ G06F 21/64 711/6 |
| 2003/0188180 A1* | 10/2003 | Overney | ............... H04L 9/3073 713/193 |
| 2018/0054314 A1* | 2/2018 | Edwards | ................ G06F 21/64 |
| 2021/0240671 A1 | 8/2021 | Fong et al. | |
| 2024/0070277 A1* | 2/2024 | Ge | ........................ G06F 21/602 |

OTHER PUBLICATIONS

Author Unknown, "fs-verity: read-only file-based authenticity protection," The Linux Kernel documentation, kernel.org, https://www.kernel.org/doc/html/next/filesystems/fsverity.html, accessed online Sep. 28, 2023, 14 pages.

Author Unknown, "containers/composefs: a file system for mounting container images," GitHub, https://github.com/containers/composefs, accessed online Sep. 28, 2023, 3 pages.

(Continued)

*Primary Examiner* — William Spieler
(74) *Attorney, Agent, or Firm* — Dority & Manning, P.A.

(57) ABSTRACT

A computing device receives a container image from a container registry, the container image comprising a plurality of layers. The computing device extracts, from the container image, a plurality of files into a filesystem of the computing device, each file of the plurality of files corresponding to one of the layers of the plurality of layers. The computing device generates a metadata file that describes a directory structure of the plurality of files in the filesystem. The computing device mounts the metadata file to a location in the filesystem, wherein mounting the metadata file causes a digest of the metadata file to be generated and the metadata file and the plurality of files in the filesystem to be read-only.

17 Claims, 7 Drawing Sheets

(56) References Cited

OTHER PUBLICATIONS

Zali, Muhammad Aizuddin, "Sign and verify container images with this open source tool," Opensource.com, https://opensource.com/article/21/12/sigstore-container-images, Dec. 6, 2021, 9 pages.
Lee, Sangho, "APRON: Authenticated and Progressive System Image Renovation," Microsoft Research, USENIX Association, https://www.usenix.org/conference/atc23/presentation/lee, 2023 USENIX Annual Technical Conference, pp. 275-292, Jul. 2023, 18 pages.
Extended European Search Report for EP Patent Application No. 24205695.0, dated Feb. 12, 2025, 8 pages.

\* cited by examiner

VALIDATION OF CONTAINER IMAGES

BACKGROUND

Container images are made of one or more layers, which can be extracted to files of a local filesystem. At runtime, a container can use these layers as an overlay lower layer with a writeable layer for the particular container.

SUMMARY

The examples disclosed herein perform validation of container images. In particular, the integrity of the files extracted to the local filesystem from the container image layers can be validated. Once the layers of a container image are extracted to the filesystem, a metadata file that describes the files and the filesystem can be created. In the kernel of the operating system, fs-verity can be enabled on the metadata file and the metadata file can then be mounted to the filesystem. As a result, the files and the filesystem are immutable and the layers of the container image that are implemented as the files in the filesystem can be validated when a container is initiated from the container image.

In one example, a method for validation of container images is provided. The method includes receiving, by a computing device executing a kernel-based operating system, a container image from a container registry, the container image comprising a plurality of layers. The method further includes extracting, by the computing device from the container image, a plurality of files into a filesystem of the computing device, each file of the plurality of files corresponding to one of the layers of the plurality of layers. The method further includes generating, by the computing device, a metadata file that describes a directory structure of the plurality of files in the filesystem. The method further includes mounting, by the computing device in a kernel of the kernel-based operating system, the metadata file to a location in the filesystem, wherein mounting the metadata file causes a digest of the metadata file to be generated and the metadata file and the plurality of files in the filesystem to be read-only.

In another example, a computing device for validation of container images is provided. The computing device includes a memory and a processor device coupled to the memory. The processor device is to receive a container image from a container registry, the container image comprising a plurality of layers. The processor device is further to extract, from the container image, a plurality of files into a filesystem of the computing device, each file of the plurality of files corresponding to one of the layers of the plurality of layers. The processor device is further to generate a metadata file that describes a directory structure of the plurality of files in the filesystem. The processor device is further to mount the metadata file to a location in the filesystem, wherein mounting the metadata file causes a digest of the metadata file to be generated and the metadata file and the plurality of files in the filesystem to be read-only.

In another example, a non-transitory computer-readable storage medium for validation of container images is provided. The non-transitory computer-readable storage medium includes computer-executable instructions to cause a processor device to receive a container image from a container registry, the container image comprising a plurality of layers. The instructions further cause the processor device to extract, from the container image, a plurality of files into a filesystem of the computing device, each file of the plurality of files corresponding to one of the layers of the plurality of layers. The instructions further cause the processor device to generate a metadata file that describes a directory structure of the plurality of files in the filesystem. The instructions further cause the processor device to mount the metadata file to a location in the filesystem, wherein mounting the metadata file causes a digest of the metadata file to be generated and the metadata file and the plurality of files in the filesystem to be read-only.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
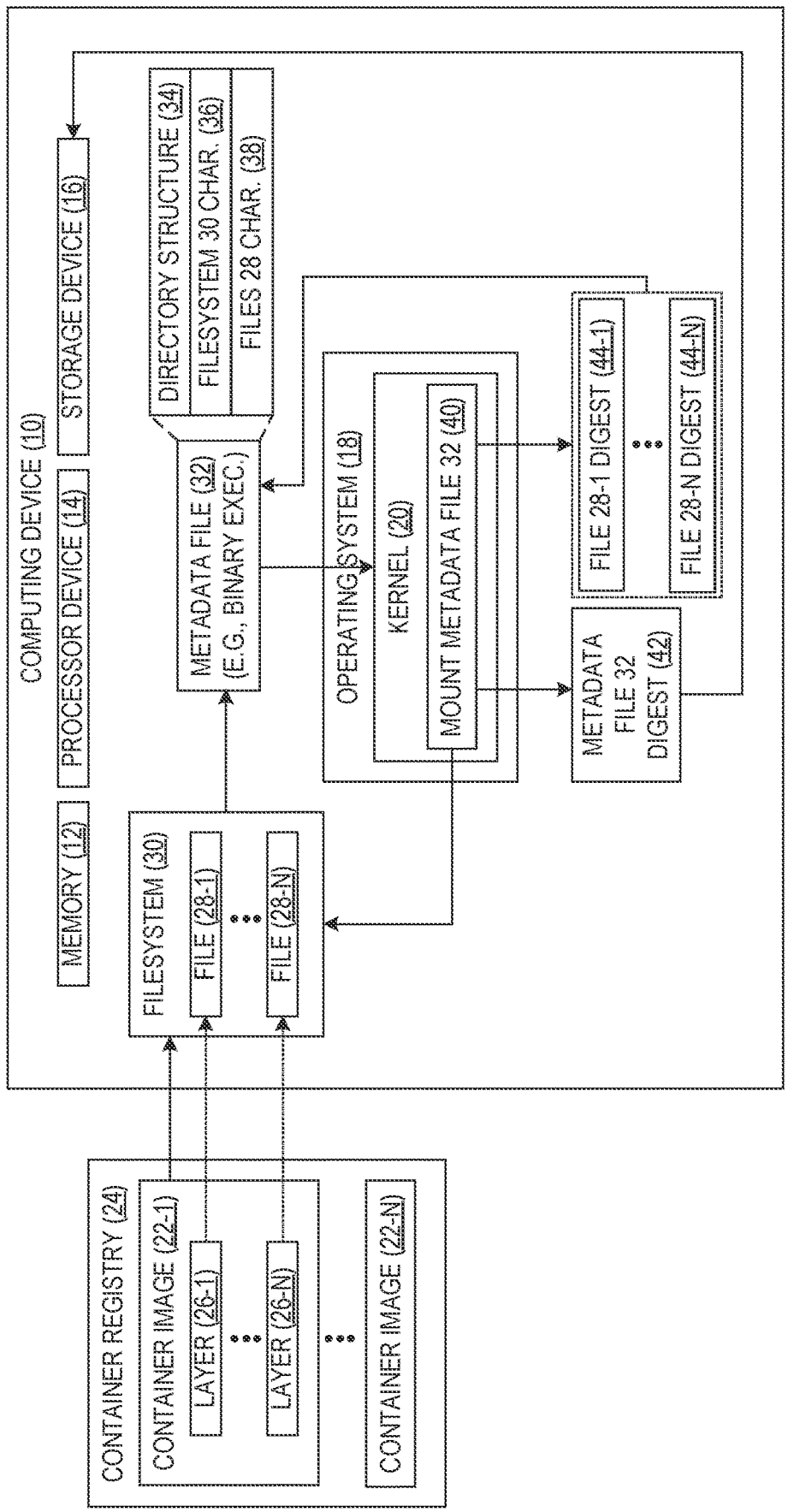
FIG. 1 is a block diagram of a computing device in which examples of validation of container images may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Containerization technologies, such as, by way of non-limiting example, Docker® container technology, Kubernetes® container technology, Podman container technology, Tectonic container technology, Amazon® Elastic Container Service (ECS) technology, and the like, are increasingly popular due, in part, to their relatively low resource requirements compared to other process isolation mechanisms, such as virtual machines. Containerization technologies can be used to run containerized applications from container images to isolate resources and processes of the containerized applications from each other. A containerized application may include tens or hundreds of different containers and other resources.

Container images are made of one or more layers, which can be extracted to files of a local filesystem. At runtime, a container can use these layers as an overlay lower layer with a writeable layer for the particular container. However, once the layers are extracted to files of the local filesystem, the ability to validate the integrity of the files and the filesystem is desired.

The examples disclosed herein perform validation of container images. In particular, the integrity of the files extracted to the local filesystem from the container image layers can be validated at runtime each time a file is accessed. Once the layers of a container image are extracted to the filesystem, a metadata file that describes the files and the filesystem can be created. In the kernel of the operating system, fs-verity can be enabled on the metadata file and the metadata file can be mounted to the filesystem. As a result, the files and the filesystem are immutable and the layers of the container image that are implemented as the files in the filesystem can be validated when a container is initiated from the container image at runtime.

Enabling fs-verity on the metadata file causes digests to be created for the metadata file and the files. When a file is accessed or a container is initiated from the container image, the digests can be used to determine whether a file and the corresponding layer of the container image have been changed or whether a file has been added, deleted, or moved. Once a container image is pulled from a container registry and the files are extracted to the local filesystem, the container image is not pulled again when containers are initiated using the container image, but validation that the files have not changed since the container image was pulled can occur each time a container is initiated with the container image by checking the digests. Upon confirmation that the files and layers have not changed, the container can be started since the container image has been validated.

The term "containerized application" as used herein refers to an application that comprises one or more container images, and is initiated and managed via a container orchestration system. The term "containerized instance" as used herein refers to an entity that includes a container that is initiated from a container image. The phrase "container" as used herein refers to Linux® containers wherein the Linux® kernel uses namespaces to isolate processes from one another. The phrase "container image" as used herein refers to a static package of software comprising one or more layers, the layers including everything needed to run an application (i.e., as a container) that corresponds to the container image, including, for example, one or more of executable runtime code, system tools, system libraries and configuration settings. An OCI (Open Container Initiative) image is an example of a container image. When executed, a container image is initiated as a Linux® container, wherein the Linux® kernel features cgroups and namespaces are used to isolate container processes from one another. A container image is often created from a containerization technology, such as, by way of non-limiting example, Docker®, Podman, or the like.

FIG. 1 is a block diagram of a computing device 10 that comprises a system memory 12, a processor device 14, a storage device 16, and an operating system 18 in which examples of validation of container images may be practiced. In particular, the operating system 18 may be a kernel-based operating system with a kernel 20 that the computing device 10 can execute. It is to be understood that although the examples described herein utilize the Linux kernel of the Linux operating system, the examples are not limited to any particular kernel-based operating system. It is to be understood that the computing device 10 in some examples may include constituent elements in addition to those illustrated in FIG. 1.

In the example of FIG. 1, the computing device 10 can receive a container image 22-1 (e.g., an OCI image) from a container registry 24, which may be a remote repository external to the computing device 10 that stores a plurality of container images 22-1-22-N, each container image including a plurality of layers 26-1-26-N (collectively, layers 26). For instance, the container image 22-1 can include the layers 26 which include everything that is needed to run an application (i.e., as a container) that corresponds to the container image 22-1, such as executable runtime code, system tools, system libraries, and configuration settings, as non-limiting examples. For example, a "docker pull" command may be used to download the container image 22-1 from the container registry 24 to the computing device 10 in implementations where the Docker® container technology is used.

A plurality of files 28-1-28-N (collectively, files 28) can be extracted from the container image 22-1 into a filesystem 30 of the computing device 10. The container image 22-1 may be a tar file that itself contains a plurality of tar files (e.g., a .tar file or a .tar.gz file, also referred to as a tarball, which contains files), each of the plurality of tar files corresponding to a layer of the layers 26 of the container image 22-1. Extracting the files 28 from the container image 22-1 can include extracting the plurality of tar files from the container image 22-1 into the filesystem 30, resulting in the files 28 being implemented in the filesystem 30, each file of the files 28 corresponding to a tar file that corresponds to a layer of the layers 26 of the container image 22-1.

A metadata file 32 can be generated at build time (e.g., when the container image 22-1 is built), the metadata file 32 describing a directory structure 34 of the files 28 in the filesystem 30. The directory structure 34 can identify the layout of the files 28 in the filesystem 30. For instance, in the Linux® operating system, the directory structure 34 includes a root directory from which the other directories of the filesystem (i.e., subdirectories) will branch off from in a tree-like structure branching from the root directory, and each of the directories can contain files. Additionally, the directory structure 34 describes the container image 22-1 since each file of the files 28 in the filesystem 30 corresponds to a layer of the layers 26 of the container image 22-1, so the directory structure 34 describes the structure of the layers 26 and the container image 22-1. The metadata file 32 may be a binary large object (sometimes referred to as a blob or BLOB) or a text file, as non-limiting examples. The metadata file 32 can include one or more of the directory structure 34 of the files 28 in the filesystem 30, characteristics 36 of the filesystem 30 or characteristics 38 of each file of the files 28, as non-limiting examples. For instance, the characteristics 36 of the filesystem 30 may include the filesystem 30 structure, directory and file information such as the number of directories or files, and other metadata about the filesystem 30. The characteristics 38 of each file of the files 28 can include the type of file, a directory where the file is located, file size, and other metadata about each file of the files 28, as non-limiting examples.

A mount 40 command can be used to mount the metadata file 32 to a location in the filesystem 30 (i.e., attach a child filesystem to the mount point specified on the filesystem 30). For example, a user using the kernel-based operating system 18 command line, such as the Linux® command line as a non-limiting example, can use the mount command and pass to the mount command the filename of the metadata file 32 and the path to the directory location to mount 40 the metadata file 32, then the mount command sends the instructions to the kernel 20 to be completed. When the metadata file 32 is written to the filesystem 30, the signature of the metadata file 32 can also be added to the filesystem 30.

The mount 40 command can include enabling fs-verity on the metadata file 32 in the kernel 20 of the operating system 18. fs-verity is a mechanism to protect files from modification. In particular, fs-verity is a checksum mechanism similar to dm-verity, except that fs-verity works on file content instead of partition content. Enabling fs-verity on a file computes hashes stored in hash-tree, such as a Merkle tree, associated with the file, then the hash values can be accessed in order to verify that the file contents have not changed. For instance, the Merkle tree can contain hashes of the blocks (i.e., contents) of the file that has fs-verity enabled. Once fs-verity is enabled on a file, the file becomes read-only and immutable, so any subsequent read from the file will return an error if a change is detected, as a hash will be computed and compared to the hash stored in the tree. For example, when a portion of the file is read from storage, such as a page of the file, the kernel can check that the hash of the page matches the hash in the Merkle tree. If the hash of the page does not match the hash in the Merkle tree, then a change is detected and an error is returned. Therefore, when fs-verity is enabled on the metadata file 32, the metadata file 32, the filesystem 30, and the files 28 in the filesystem 30 are read-only and immutable since the metadata file 32 describes the directory structure 34 of the files 28 of the filesystem 30. As a result, a change in any of the metadata, such as a change to the contents of a file, or the addition, removal, or replacement of a file in the filesystem 30, can be detected. Additionally, because each of the files 28 corresponds to a layer of the layers 26 of the container image 22-1, when a container is initiated with the container image 22-1, the container will use these layers 26, which are now read-only, as an overlay lower layer with a writeable layer for the particular container and the container image 22-1 can be validated as not having been changed in the time since it was downloaded to the computing device 10.

Enabling fs-verity on the metadata file 32 also causes a digest 42 of the metadata file 32 and a plurality of digests 44-1-44-N (collectively, digests 44), one digest for each file of the files 28 which corresponds to the layers 26, to be generated. The digest 42 and the digests 44 may be produced when fs-verity hashes the contents of the file that fs-verity is enabled on (e.g., the metadata file 32), resulting in a digest that cryptographically identifies the file contents. For instance, the digest 42 and the digests 44 may be the computed hashes, checksums, or signatures, as non-limiting examples, for the metadata file 32 and the files 28 respectively. The digest 42 of the metadata file 32 can be stored in a location on the computing device 10, such as the storage device 16 or the filesystem 30, and the digests 44 can be included in the metadata file 32. The metadata file 32 does not include the contents of the files 28 in the filesystem 30 but instead includes a path pointing to the file that has the contents. The contents of the files 28 are still protected from unwanted changes (e.g., by mistake or malice) once fs-verity is enabled since the files 28 will each have a current digest to match with the digests 44 generated when fs-verity was enabled on the metadata file 32, so any changes in the files 28 (i.e., the layers 26) can be detected when the files 28 are used or accessed at runtime by comparing the digests.

Once the container image 22-1 is pulled from the container registry 24 and the files 28 corresponding to the layers 26 are extracted to the filesystem 30, the container image 22-1 is not pulled again when containers are initiated using the container image 22-1. If multiple container images share a same layer that was in the container image 22-1 that was pulled from the container registry 24, then the layer is not downloaded again. Instead, the layer that has been pulled and extracted to the filesystem 30 as the files 28 will be used by the container images that share that layer. The container images that share that layer can verify that the layer has not been changed because the digests 44 for the files 28 corresponding to the layers 26, which includes the shared layer, were generated when fs-verity was enabled, so the digests 44 can be used to validate that the layer is the correct layer and has not changed in the time since the container image 22-1 with the shared layer was pulled from the container registry 24.

Figure 2:
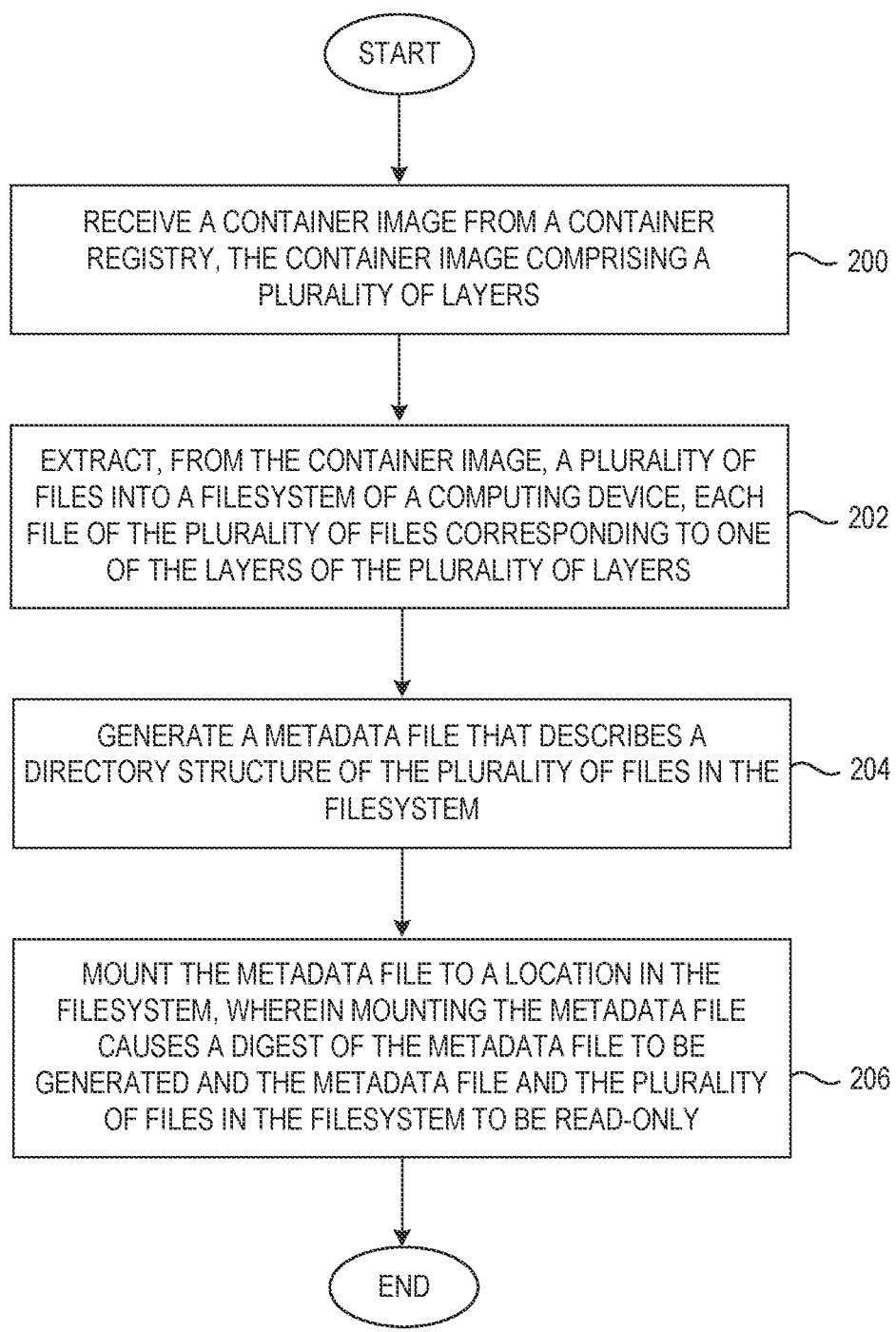
FIG. 2 is a flowchart illustrating operations performed by the computing device of FIG. 1 for validation of container images, according to one example.

FIG. 2 is a flowchart illustrating operations performed by the computing device of FIG. 1 for validation of container images, according to one example. Elements of FIG. 1 are referenced in describing FIG. 2 for the sake of clarity. In FIG. 2, operations begin with a processor device of a computing device, such as the processor device 14 of the computing device 10 of FIG. 1, the processor device 14 to receive a container image from a container registry, the container image comprising a plurality of layers (block 200). The processor device 14 is further to extract, from the container image, a plurality of files into a filesystem of a computing device, each file of the plurality of files corresponding to one of the layers of the plurality of layers (block 202). The processor device 14 is further to generate a metadata file that describes a directory structure of the plurality of files in the filesystem (block 204). The processor device 14 is further to mount the metadata file to a location in the filesystem, wherein mounting the metadata file causes a digest of the metadata file to be generated and the metadata file and the plurality of files in the filesystem to be read-only (block 206).

Figure 3:
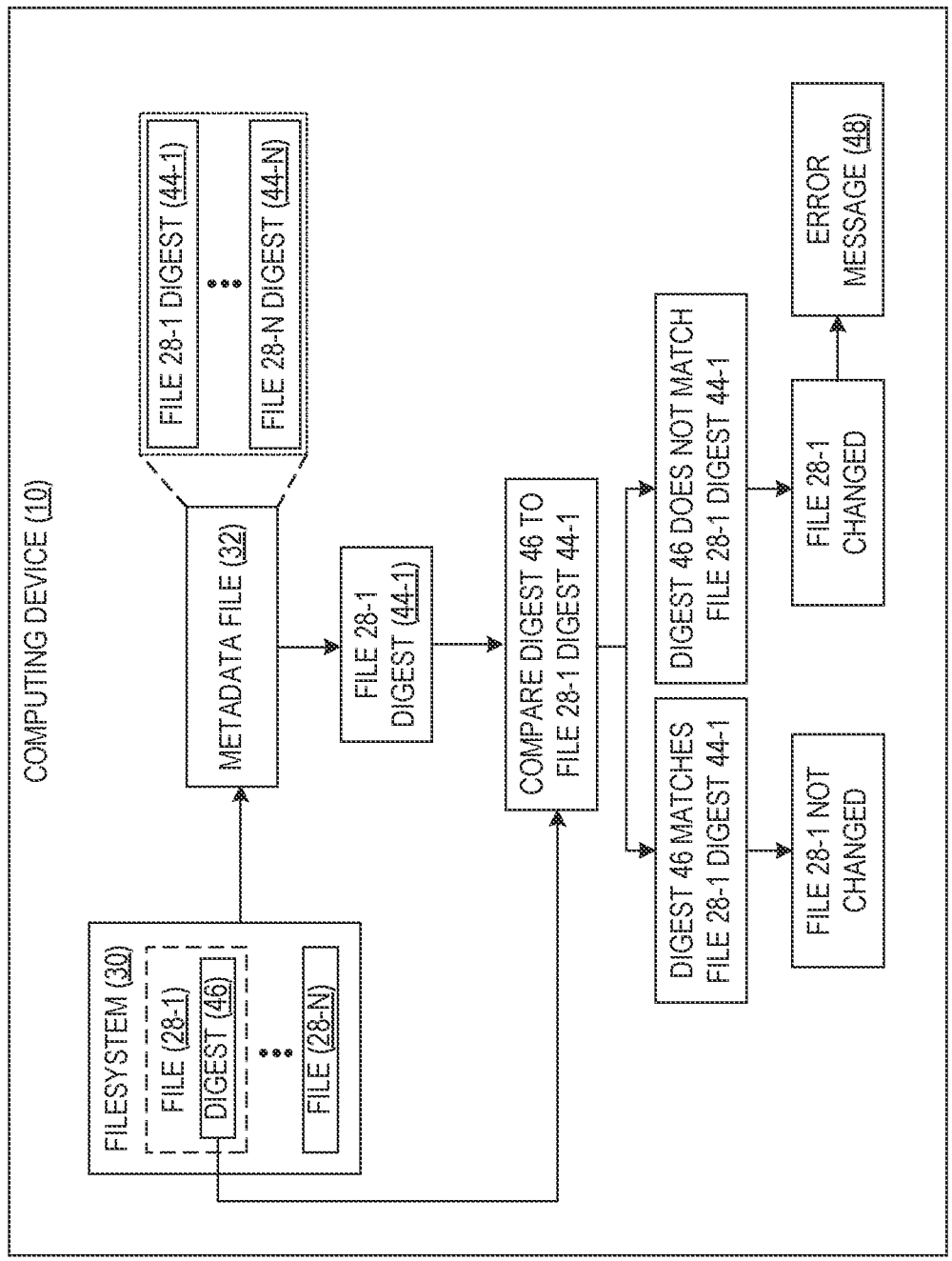
FIG. 3 is a block diagram of the computing device of FIG. 1 for validation of container images, according to one example.

FIG. 3 is a block diagram of the computing device of FIG. 1 for validation of container images, according to one example. Elements of FIG. 1 are referenced in describing FIG. 3 for the sake of clarity. In the example of FIG. 3, the computing device 10 may, at runtime, determine that a file of the filesystem 30 (e.g., file 28-1) is being accessed after the metadata file 32 was mounted. The digest 44-1 of the file 28-1, which corresponds to layer 26-1 of the container image 22-1, can be obtained from the metadata file 32, which contains the digests 44 for the files 28 which correspond to the layers 26. The computing device 10, such as in the kernel 20, can determine that a current digest 46 of the file 28-1 matches or does not match the digest 44-1 of the file that was already generated. If the current digest 46 of the file 28-1 matches the digest 44-1 of the file 28-1, then the file 28-1 has not changed since the digest 44-1 was generated because a digest is a function of the content of a file, so a change to the content of the file results in a new digest (e.g., the current digest 46). The current digest 46 of the file 28-1 may be associated with the digest that is expected upon reading the file 28-1 after fs-verity was enabled, which generated the digest 44-1 of the file 28-1. The current digest 46 for the file 28-1 may contain Merkle trees with the hashes that are expected for the file 28-1, checksums, or signatures that are expected for the file 28-1, as non-limiting examples. For instance, a read of the file 28-1 may occur, a hash can be computed, which can be identified in a Merkle tree in the current digest 46 for the file 28-1, and that computed hash can be compared to the hashes in the digest 44-1 for the file 28-1 (e.g., the hashes in the Merkle tree of the file 28-1). In another example, the digest 44-1 for the file 28-1 and the current digest 46 for the file 28-1 may each be a cryptographic hash or signature, such as a SHA-256 generated signature, for the file 28-1 which corresponds to the layer 26-1, a read of the file 28-1 may occur, and the cryptographic hash or signature of the current digest 46 can be compared to the cryptographic hash or signature in the digest 44-1.

For example, a request to open a file or use the file for a container (e.g., as an overlay lower layer) may be received, the digest 44-1 of the file 28-1 can be obtained from the metadata file 32, and the current digest 46 of the file 28-1 can be obtained from the file 28-1, the filesystem 30, or another location on the computing device 10. The digest 44-1 of the file 28-1 can be compared to the current digest 46 of the file 28-1, such as by comparing the hashes in the digest 44-1 to the hashes in the current digest 46 (e.g., the hashes in the Merkle tree of the file 28-1), to determine whether the digest 44-1 and the current digest 46 match or not. When the digest 44-1 of the file 28-1 matches the current digest 46 of the file 28-1 (i.e., the digests are the same), then the computing device 10 can verify that the file 28-1 (i.e., the layer 26-1) has not been changed in the time since the container image 22-1 was pulled from the container registry 24. An error message 48 may be returned if the hash or signature in the current digest 46 and the hash or signature in the digest 44-1 for the file 28-1 do not match. The error message 48 may indicate that there is an error in the file 28-1 or the layer 26-1 or that the content of the file 28-1 or the layer 26-1 has changed in the time since the container image 22-1 was pulled.

Figure 4:
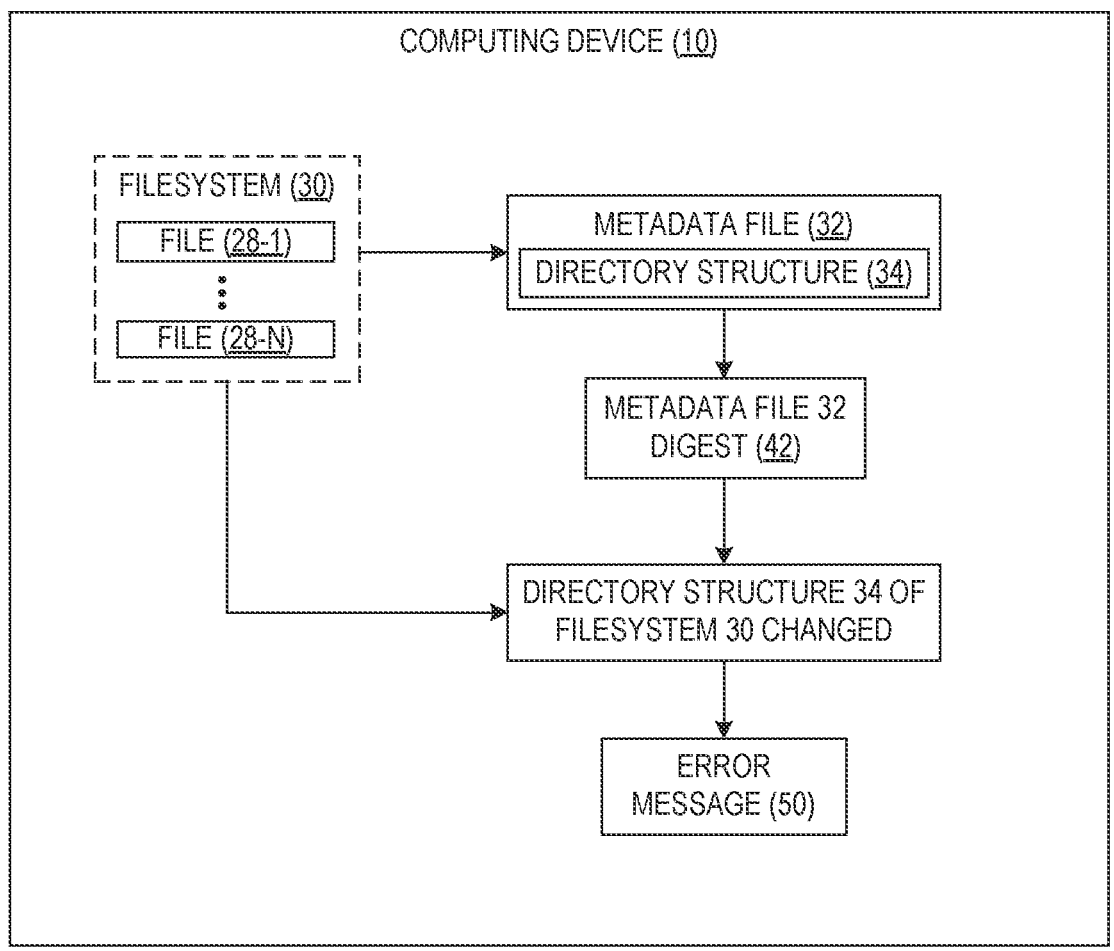
FIG. 4 is a block diagram of the computing device of FIG. 1 for validation of container images, according to one example.

FIG. 4 is a block diagram of the computing device of FIG. 1 for validation of container images, according to one example. Elements of FIG. 1 are referenced in describing FIG. 4 for the sake of clarity. In the example of FIG. 4, the computing device 10 may, at runtime, determine that the filesystem 30 is being accessed after the metadata file 32 was mounted. The digest 42 of the metadata file 32 may be obtained, such as from the storage device 16, the filesystem 30, or another location of the computing device 10, and the digest 42 can be used to verify whether the directory structure 34 of the files 28 in the filesystem 30, which describes the structure of the layers 26 and the container image 22-1, have been modified (e.g., whether files have been added, deleted, or moved in the directories). The files 28 that are in the directories of the filesystem 30, the metadata of the files 28, the metadata of the filesystem 30, and the directory structure 34 of the filesystem 30 (i.e., the structure of the layers 26 and the container image 22-1) are safe from modifications, which can be verified by validating the digest 42 of the metadata file 32, because the metadata file 32 describes the content of the filesystem 30, such as the directory structure 34, and fs-verity was enabled on the metadata file 32 during the mount 40. For example, the metadata file 32 can have a signature (e.g., a PKCS #7 formatted signature) and the kernel 20 can validate the signature of the metadata file 32 with the certificates in the fs-verity keyring to determine whether the metadata file 32 has been changed, or fs-verity can use the digest 42 to validate the metadata file 32, such as by an fsverity command. An error message 50 can be returned if the metadata file 32 is not validated. The error message 50 may indicate that there is an error in the filesystem 30, such as that a file was added, deleted, or moved, or that the directory structure 34 (i.e., the structure of the layers 26 and the container image 22-1) has changed in the time since the container image 22-1 was pulled.

Figure 5:
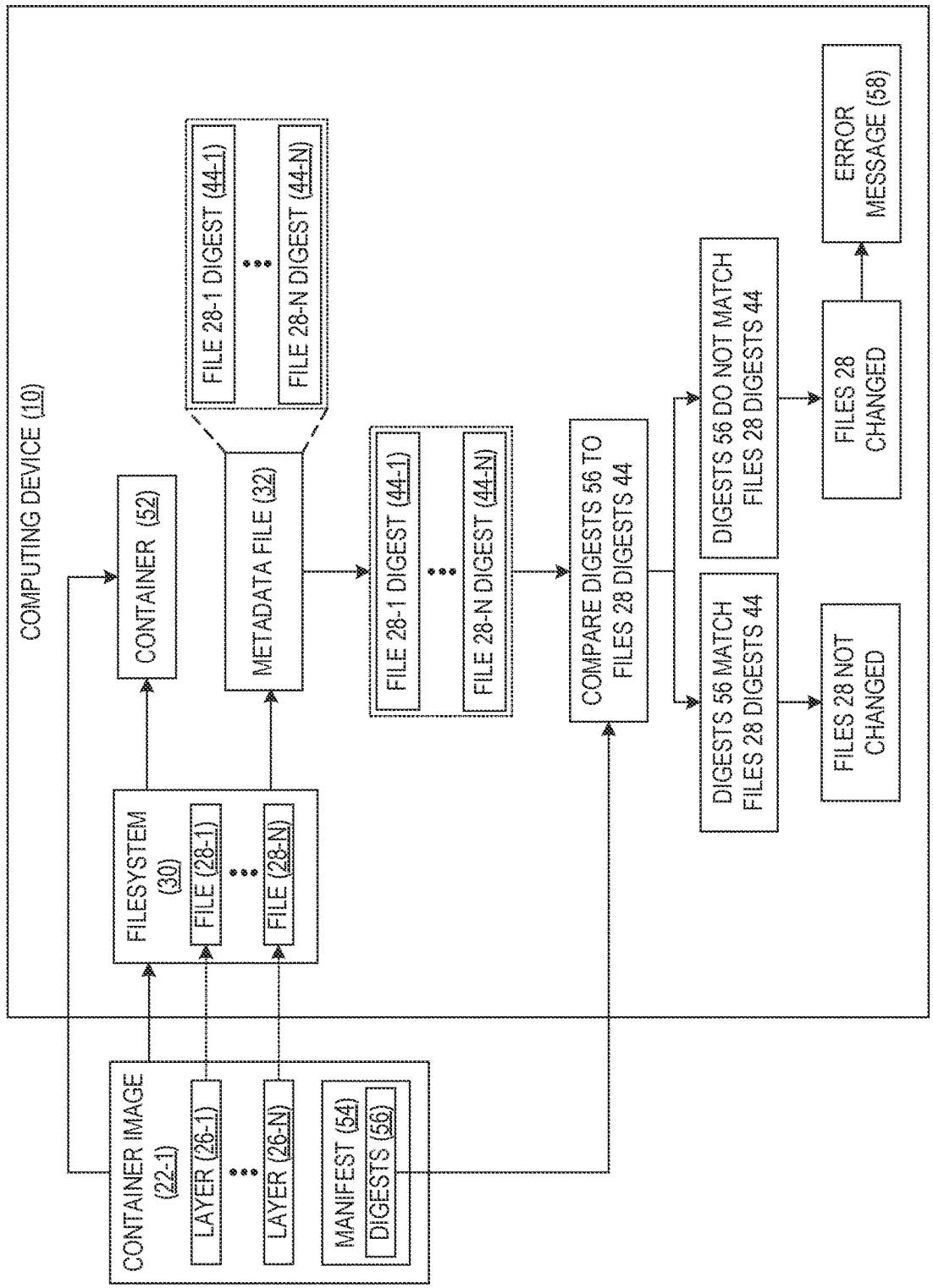
FIG. 5 is a block diagram of the computing device of FIG. 1 for validation of container images, according to one example.

FIG. 5 is a block diagram of the computing device of FIG. 1 for validation of container images, according to one example. Elements of FIG. 1 are referenced in describing FIG. 5 for the sake of clarity. In the example of FIG. 5, at runtime, a container 52 may be initiated from the container image 22-1. The files 28 in the filesystem 30, which correspond to the layers 26 of the container image 22-1 that were extracted from the container image 22-1 into the filesystem 30, can be accessed (e.g., to use as an overlay lower layer for the container 52). The digests 44 can be obtained from the metadata file 32, which can contain the digests 44 for the files 28 with each digest corresponding to a file. A manifest file 54 of the container image 22-1 can include one or more current digests 56, such as one digest for each file of the files 28 which corresponds to one digest for each layer of the layers 26 that were extracted from the container image 22-1 to the filesystem 30. The manifest file 54 contains information about the container image 22-1, such as the layers 26, size, and current digests 56, as non-limiting examples. The manifest file 54 may also include a link to the metadata file 32 and the signature of the metadata file 32.

The computing device 10, such as in the kernel 20, can determine that the current digests 56 match or do not match the digests 44 for the files 28 (i.e., the layers 26). The current digests 56 may be associated with the digests that are expected upon initiating the container 52 with the container image 22-1 at runtime. The current digests 56 may each be a cryptographic hash or signature, such as a SHA-256 generated signature, for a file of the files 28 which corresponds to a layer of the layers 26 that were extracted from the container image 22-1 to the filesystem 30. The current digests 56 can be obtained from the manifest file 54 to determine that the current digests 56 match or do not match the digests 44 for the files 28 (i.e., the layers 26). For instance, the hashes in the digests 44 can be compared to the hashes in the current digests 56 to determine whether the digests 44 and the current digests 56 match. Each digest of the digests 44 can be compared to a corresponding current digest of the current digests 56. For example, the digest 44-1 for file 28-1, which corresponds to layer 26-1, can be compared to the current digest 56-1 which corresponds to the layer 26-1 of the container image 22-1.

When the digests 44 of the files 28 match the current digests 56 (i.e., the digests are the same), then the computing device 10 can verify that the files 28 (i.e., the layers 26) have not been changed in the time since the container image 22-1 was pulled. An error message 58 may be returned if the hash or signature in one of the current digests 56 and the hash or signature in the corresponding digest of the digests 44 for the files 28 do not match. For example, the hash in current digest 56-1 may not match the hash in the corresponding digest 44-1 and the error message 58 can be sent. The error message 58 may indicate that there is an error in one or more of the files 28 or the layers 26 or that the content of the files 28 or the layers 26 has changed in the time since the container image 22-1 was pulled. The error message 58 may also identify which of the files 28 or layers 26 has an unmatched digest.

Figure 6:
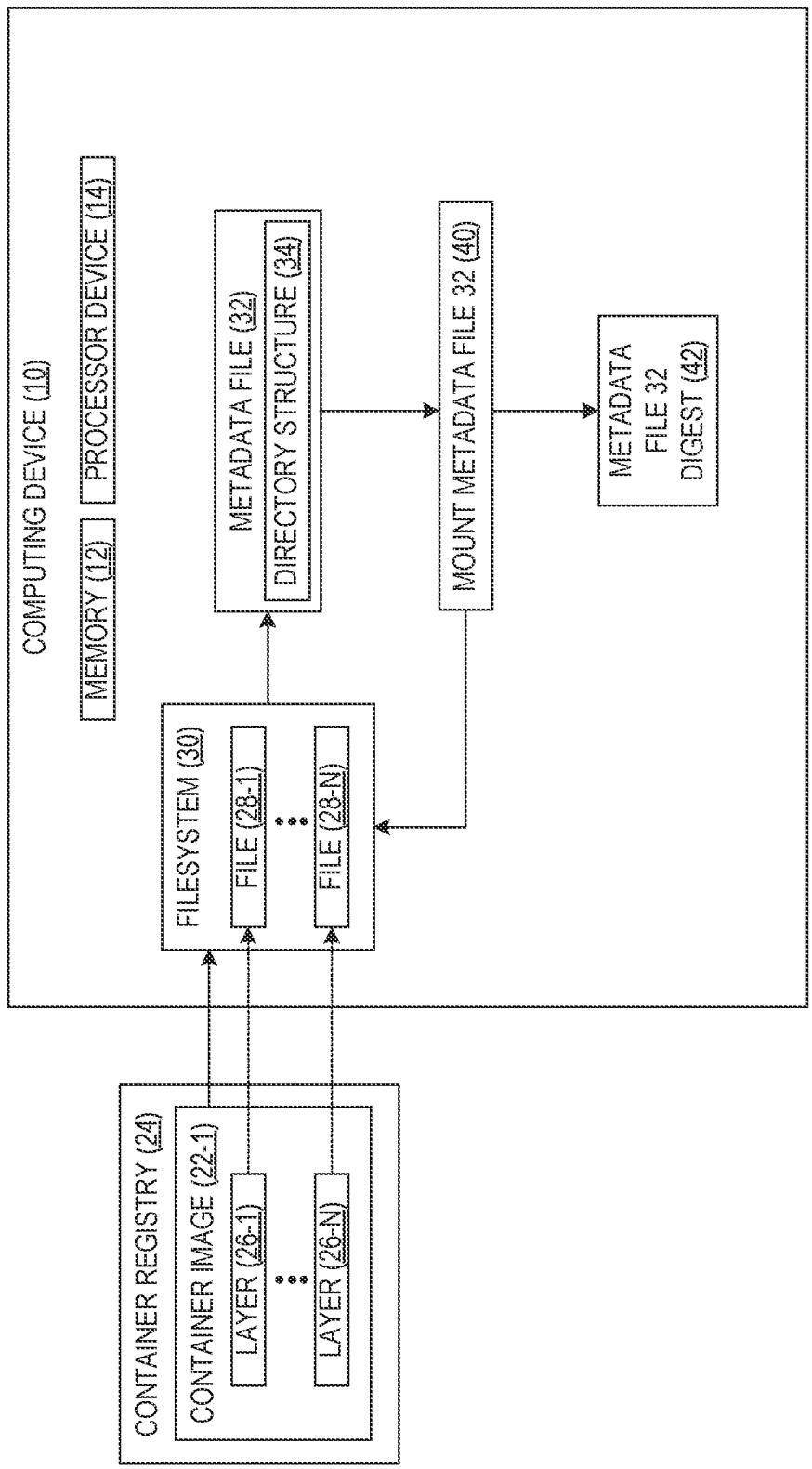
FIG. 6 is a block diagram of the computing device of FIG. 1 for validation of container images, according to one example.

FIG. 6 is a simpler block diagram of the computing device of FIG. 1 for validation of container images, according to one example. Elements of FIG. 1 are referenced in describing FIG. 6 for the sake of clarity. In the example of FIG. 6, the computing device 10 includes a system memory 12 and a processor device 14 coupled to the system memory 12. The processor device 14 is to receive a container image 22-1 from a container registry 24, the container image 22-1 comprising a plurality of layers 26-1-26-N. The processor device 14 is further to extract, from the container image 22-1, a plurality of files 28-1-28-N into a filesystem 30 of the computing device 10, each file of the plurality of files 28-1-28-N corresponding to one of the layers of the plurality of layers 26-1-26-N. The processor device 14 is further to generate a metadata file 32 that describes a directory structure 34 of the plurality of files 28-1-28-N in the filesystem 30. The processor device 14 is further to mount 40 the metadata file 32 to a location in the filesystem 30, wherein mounting the metadata file 32 causes a digest 42 of the metadata file 32 to be generated and the metadata file 32 and the plurality of files 28-1-28-N in the filesystem 30 to be read-only.

Figure 7:
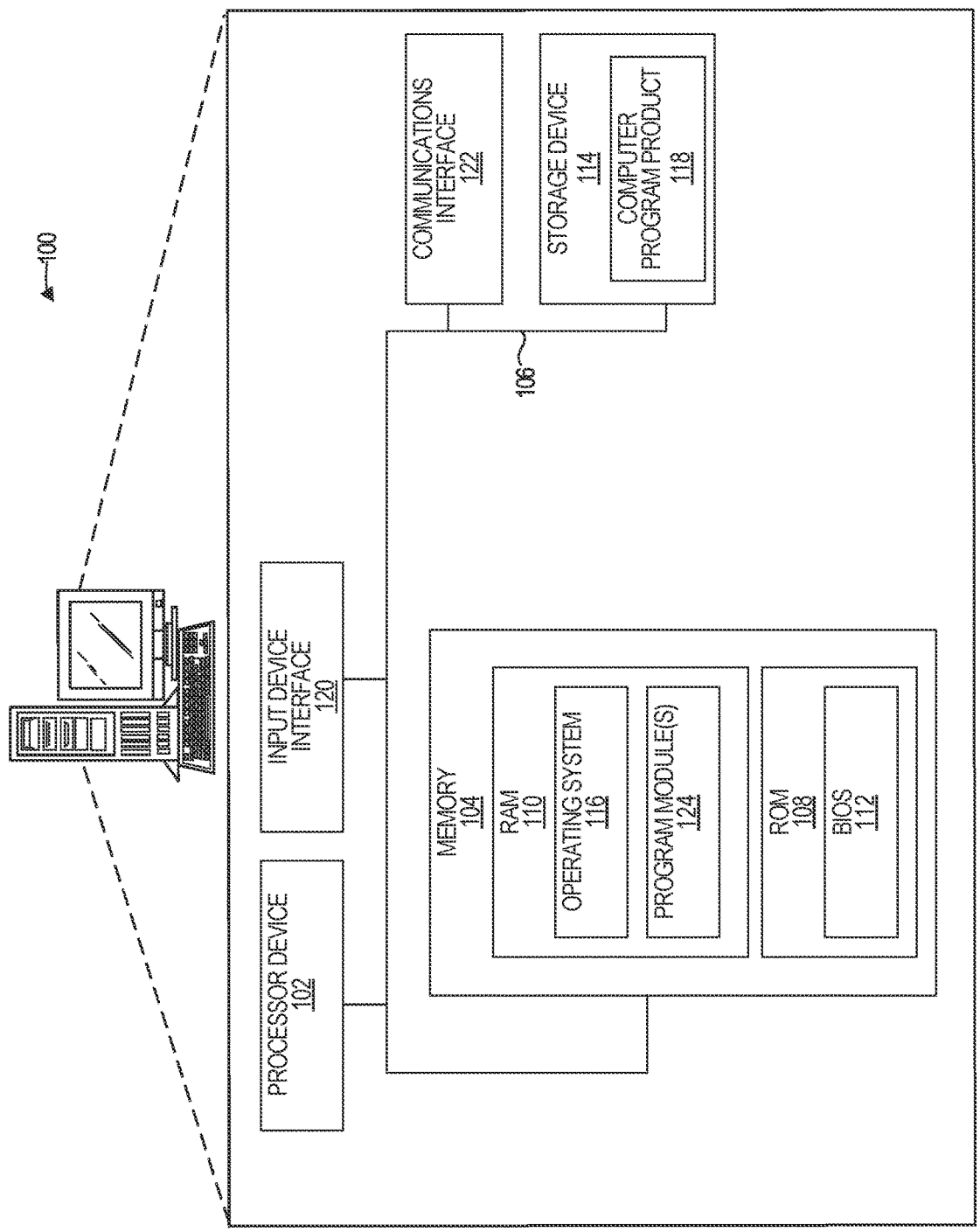
FIG. 7 is a block diagram of a computing device suitable for implementing examples, according to one example.

FIG. 7 is a block diagram of a computing device 100, such as the computing device 10 of FIG. 1, suitable for implementing examples according to one example. The computing device 100 may comprise any computing or electronic device capable of including firmware, hardware, and/or executing software instructions to implement the functionality described herein. The computing device 100 includes a processor device 102, such as the processor device 14, a system memory 104, such as the system memory 12, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, such as the storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules 124, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the one or more program modules 124 in the volatile memory 110, may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
   extracting, by a computing system executing a kernel based operating system, a plurality of files from a container image into a filesystem of a container registry of the computing system, the container image comprising a plurality of layers, each file of the plurality of files corresponding to one of the layers of the plurality of layers;
   generating, by the computing system, a metadata file that comprises a directory structure of the plurality of files in the filesystem of the container registry, wherein the directory structure points to a plurality of file locations from which the plurality of files can be respectively accessed within the filesystem of the container registry, and wherein the metadata file does not include contents of the plurality of files in the filesystem;
   mounting, by the computing system in a kernel of the kernel-based operating system, the metadata file to a mount point, wherein mounting the metadata file causes a first digest of the metadata file to be generated and the metadata file and the plurality of files in the filesystem of the container registry to be read-only, wherein the first digest comprises cryptographic information that identifies a plurality of digests of the plurality of files in the filesystem, and wherein mounting the metadata file further causes a file of the plurality of files to be pulled to the mount point from a first file location of the plurality of file locations pointed to by the metadata file;

subsequent to mounting the metadata file to the mount point, determining, by the computing system, that the filesystem is being accessed;

responsive to determining that the filesystem is being accessed, generating, by the computing system, a second digest of the metadata file;

determining, by the computing system based on a comparison of the first digest to the second digest, that the directory structure of the plurality of files in the filesystem has not changed; and responsive to determining that the directory structure of the plurality of files has not changed, instantiating, by the computing system, a container using the file pulled to the mount point from the first file location.

2. The method of claim 1, wherein mounting the metadata file further causes the plurality of digests to be generated and the metadata file to include the plurality of digests.

3. The method of claim 2, further comprising:
subsequent to mounting the metadata file to the mount point, determining that a particular file of the plurality of files in the filesystem is being accessed;
obtaining, from the metadata file, a third digest of the plurality of digests, the third digest corresponding to the particular file; and
determining that a current digest of the particular file matches or does not match the third digest corresponding to the particular file.

4. The method of claim 3, further comprising:
determining that there is a match between the current digest of the particular file and the third digest corresponding to the particular file; and
verifying, based on the match, that the particular file has not been changed.

5. The method of claim 3, further comprising:
determining that there is not a match between the current digest of the particular file and the third digest corresponding to the particular file; and
sending a message indicating an error in the particular file.

6. The method of claim 1, further comprising:
accessing the plurality of files in the filesystem; and
obtaining, from the metadata file, the plurality of digests.

7. The method of claim 6, further comprising, for each file of the plurality of files:
subsequent to obtaining the plurality of digests, determining that there is a match between a current digest of the file and a corresponding digest of the plurality of digests, wherein a manifest file of the container image includes the current digest of each file of the plurality of files; and
verifying, based on the match, that the file has not been changed.

8. The method of claim 6, further comprising:
subsequent to obtaining the plurality of digests, determining that there is not a match between at least one current digest of a particular file of the plurality of files and a corresponding digest of the plurality of digests, wherein a manifest file of the container image includes a current digest of each file of the plurality of files; and
sending a message indicating an error in the container image.

9. The method of claim 1, further comprising:
subsequent to mounting the metadata file to the mount point, storing the first digest of the metadata file in a location on the computing system.

10. The method of claim 1, wherein the metadata file includes one or more of characteristics of the filesystem, characteristics of each file of the plurality of files, or a layout of the filesystem.

11. A computing system, comprising:
a memory;
one or more processor devices coupled to the memory, the one or more processor devices to:
extract, from a container image, a plurality of files into a filesystem of a container registry of the computing system, the container image comprising a plurality of layers, each file of the plurality of files corresponding to one of the layers of the plurality of layers;
generate a metadata file that comprises a directory structure of the plurality of files in the filesystem of the container registry, wherein the directory structure points to a plurality of file locations from which the plurality of files can be respectively accessed within the filesystem of the container registry, and wherein the metadata file does not include contents of the plurality of files in the filesystem;
mount the metadata file to a mount point, wherein mounting the metadata file causes a first digest of the metadata file to be generated and the metadata file and the plurality of files in the filesystem of the container registry to be read-only, wherein the first digest comprises cryptographic information that identifies a plurality of digests of the plurality of files in the filesystem, and wherein mounting the metadata file further causes a file of the plurality of files to be pulled to the mount point from a first file location of the plurality of file locations pointed to by the metadata file;
subsequent to mounting the metadata file to the mount point, determine that the filesystem is being accessed;
responsive to determining that the filesystem is being accessed, generate a second digest of the metadata file;
determine, based on a comparison of the first digest to the second digest, that the directory structure of the plurality of files in the filesystem has not changed; and
responsive to determining that the directory structure of the plurality of files has not changed, instantiate a container using the file pulled to the mount point from the first file location.

12. The computing system of claim 11, wherein to mount the metadata file, the one or more processor devices are further to cause the plurality of digests to be generated and the metadata file to include the plurality of digests.

13. The computing system of claim 12, wherein the one or more processor devices are further to:
subsequent to mounting the metadata file to the mount point, determine that a particular file of the plurality of files in the filesystem is being accessed;
obtain, from the metadata file, a third digest of the plurality of digests, the third digest corresponding to the particular file; and
determine that a current digest of the particular file matches or does not match the third digest corresponding to the particular file.

14. The computing system of claim 11, wherein the one or more processor devices are further to:

access the plurality of files in the filesystem; and obtain, from the metadata file, the plurality of digests.

15. A non-transitory computer-readable storage medium that includes computer-executable instructions that, when executed, cause one or more processor devices to:
    extract, from a container image, a plurality of files into a filesystem of a container registry of a computing system, the container image comprising a plurality of layers, each file of the plurality of files corresponding to one of the layers of the plurality of layers;
    generate a metadata file that comprises a directory structure of the plurality of files in the filesystem of the container registry, wherein the directory structure points to a plurality of file locations from which the plurality of files can be respectively accessed within the filesystem of the container registry, and wherein the metadata file does not include contents of the plurality of files in the filesystem;
    mount the metadata file to a mount point, wherein mounting the metadata file causes a first digest of the metadata file to be generated and the metadata file and the plurality of files in the filesystem of the container registry to be read-only, wherein the first digest comprises cryptographic information that identifies a plurality of digests of the plurality of files in the filesystem, and wherein mounting the metadata file further causes a file of the plurality of files to be pulled to the mount point from a first file location of the plurality of file locations pointed to by the metadata file;
    subsequent to mounting the metadata file to the mount point, determine that the filesystem is being accessed;
    responsive to determining that the filesystem is being accessed, generate a second digest of the metadata file;
    determine, based on a comparison of the first digest to the second digest, that the directory structure of the plurality of files in the filesystem has not changed; and
    responsive to determining that the directory structure of the plurality of files has not changed, instantiate a container using the file pulled to the mount point from the first file location.

16. The non-transitory computer-readable storage medium of claim 15, wherein to mount the metadata file, the instructions further cause the one or more processor devices to cause the plurality of digests to be generated, and the metadata file to include the plurality of digests.

17. The non-transitory computer-readable storage medium of claim 16, wherein the computer-executable instructions are further to cause the one or more processor devices to:
    subsequent to mounting the metadata file to the mount point, determine that a particular file of the plurality of files in the filesystem is being accessed;
    obtain, from the metadata file, a third digest of the plurality of digests, the third digest corresponding to the particular file; and
    determine that a current digest of the particular file matches or does not match the third digest corresponding to the particular file.

* * * * *